DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1148

T878,018

PROCESS FOR INSOLUBILIZING POLY-CARBONATES AND POLYESTERS

Winston J. Jackson, Jr., and John R. Caldwell, both of P.O. Box 511, Kingsport, Tenn. 37662

Continuation of application Ser. No. 688,992, Dec. 8, 1967. This application Jan. 28, 1970, Ser. No. 7,378

Int. Cl. C08g *39/10*

U.S. Cl. 260—860

No Drawing. 14 Pages Specification

Polycarbonates and polyesters, each being derived from a bisphenol and each being free of olefinic unsaturation, are rendered insoluble in common solvents (for example, methylene chloride and chloroform) by heating, in the presence of molecular oxygen, a blend of said polymer and a glycol polyester of a dicarboxylic acid and an aliphatic or cycloaliphatic glycol.